US007003473B2

(12) United States Patent
Curtis et al.

(10) Patent No.: US 7,003,473 B2
(45) Date of Patent: Feb. 21, 2006

(54) FULLY INTEGRATED SERVICE MANAGER WITH AUTOMATIC FLOW-THROUGH INTERCONNECTION

(75) Inventors: David C. Curtis, Crofton, MD (US); Christopher Selwood, Bethesda, MD (US)

(73) Assignee: Wisor Telecom Corporation, Rockville, MD (US)

( * ) Notice: Subject to any disclaimer, the term of this patent is extended or adjusted under 35 U.S.C. 154(b) by 199 days.

(21) Appl. No.: 09/748,837

(22) Filed: Dec. 27, 2000

(65) Prior Publication Data

US 2001/0034627 A1    Oct. 25, 2001

Related U.S. Application Data

(60) Provisional application No. 60/176,571, filed on Jan. 18, 2000.

(51) Int. Cl.
*G06F 17/60*    (2006.01)

(52) U.S. Cl. .......................................................... 705/7
(58) Field of Classification Search .................... 705/1, 705/7, 8, 9, 10, 26, 34; 370/352; 455/430; 713/201; 700/101
See application file for complete search history.

(56) References Cited

U.S. PATENT DOCUMENTS

| 4,992,940 A | * | 2/1991 | Dworkin ....................... 705/26 |
| 5,287,270 A | * | 2/1994 | Hardy et al. ................... 705/34 |
| 5,325,290 A | * | 6/1994 | Cauffman et al. ............. 705/34 |
| 5,416,833 A | | 5/1995 | Harper et al. |
| 5,526,404 A | * | 6/1996 | Wiedeman et al. ......... 455/430 |
| 5,541,917 A | * | 7/1996 | Farris ......................... 370/352 |
| 5,570,291 A | | 10/1996 | Dudle et al. |
| 5,754,543 A | | 5/1998 | Seid |
| 5,761,432 A | | 6/1998 | Bergholm et al. |
| 5,809,282 A | | 9/1998 | Cooper et al. |
| 5,815,665 A | * | 9/1998 | Teper et al. ................. 709/229 |
| 5,847,751 A | * | 12/1998 | Safadi ......................... 725/119 |
| 5,875,242 A | | 2/1999 | Glaser et al. |
| 5,920,846 A | | 7/1999 | Storch et al. |
| 5,950,201 A | | 9/1999 | Van Huben et al. |
| 5,963,948 A | | 10/1999 | Shilcrat |
| 6,032,132 A | | 2/2000 | Nelson |

(Continued)

FOREIGN PATENT DOCUMENTS

JP    02001325509 A    11/2001

(Continued)

OTHER PUBLICATIONS

SP-to_SP Service Ordering Specification and its Implementation. Chen et al., Citr, Aust., Proceedings of the 1998 IEEE Network Operations and Management Symposium . Part 1 (of 3), pp 80-89, 1998.*

(Continued)

*Primary Examiner*—Susanna M. Diaz
*Assistant Examiner*—Peter Choi
(74) *Attorney, Agent, or Firm*—Roberts, Abokhair & Mardula LLC

(57) ABSTRACT

A system for management of an integrated communications provider comprising a means of automatically retrieving customer service records and preparing sales proposals therefrom. The invention further comprises components for pre-ordering management functions, circuit management, design management, service management, and gateway to incumbent local exchange carriers and trading partners. The system incorporates features that automate comparisons between existing services and proposal services, alarming of failures of confirmations, optimizing on-net and off-net services, creation of cutover reports and issuance of service requests to local exchange carriers and trading partners.

20 Claims, 8 Drawing Sheets

U.S. PATENT DOCUMENTS

| | | | |
|---|---|---|---|
| 6,038,668 A | * | 3/2000 | Chipman et al. ............ 713/201 |
| 6,104,999 A | | 8/2000 | Gilles et al. |
| 6,141,647 A | * | 10/2000 | Meijer et al. .................. 705/1 |
| 6,282,518 B1 | * | 8/2001 | Farrell et al. ................. 705/26 |
| 2002/0038232 A1 | | 3/2002 | Nihira |
| 2002/0046147 A1 | | 4/2002 | Livesay et al. |

FOREIGN PATENT DOCUMENTS

| | | | |
|---|---|---|---|
| WO | WO 91/03023 | * | 3/1991 |

OTHER PUBLICATIONS

THe Secret of CLEC success. Telephony; Chicago, Apr. 12, 1999. Jhon B Muleta, David S Curtis, Vaikunth N Gupta, v236, issue 15, pp36-42.*

SP-to-Sp Service Ordering Specification and its Implementation. Chen et al., Citr. Aust., Proceedings of the 1998 IEEE Network Operations and Management Sysmposium. Part 1 (of 3), pp80-89, 1998.*

Sp-to-SP Service Ordering Specification and its Implementation. Chen et al., Citr. Aust., Proceedings of the 1998 IEEE Network Operations and Management Symposium. Part 1(of 3), pp 80-89, 1998.*

Newron's Telecom Dictionary 14$^{th}$ Edition, 1998, pp. 193, 319 and 372.*

Dictinary of Object Technology, Sigs Reference Library. Donald G. Firsmith & Edward M. Eykholt, 1995.*

Dictinary of Computer and Internet Terms, Barron's Business Guides, Fifth Edition, 1996, pp. 273-274.*

IEEE 100, The Authoritative Dictionary of IEEE Standards Terms, Seventh Edition, 2000, p. 795.*

SP-to-SP Service Ordering Specification and its Implementation. Chen et al., IEEE Symposium Record on Network Operations and Management Symposium, v1 1998. IEEE, Piscataway, NJ, USA, 98CB36158, pp80-89, Feb. 15-20, 1998.*

* cited by examiner

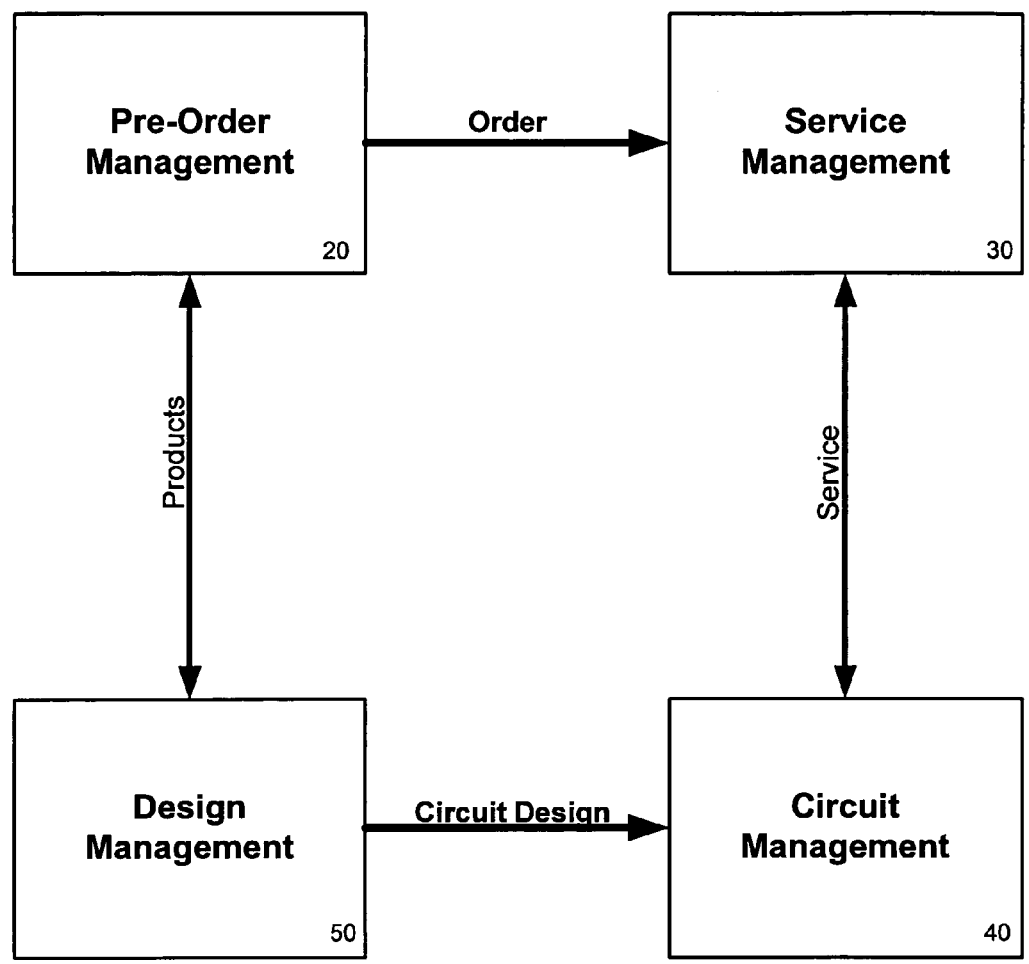
Figure 1 - Service Manager System

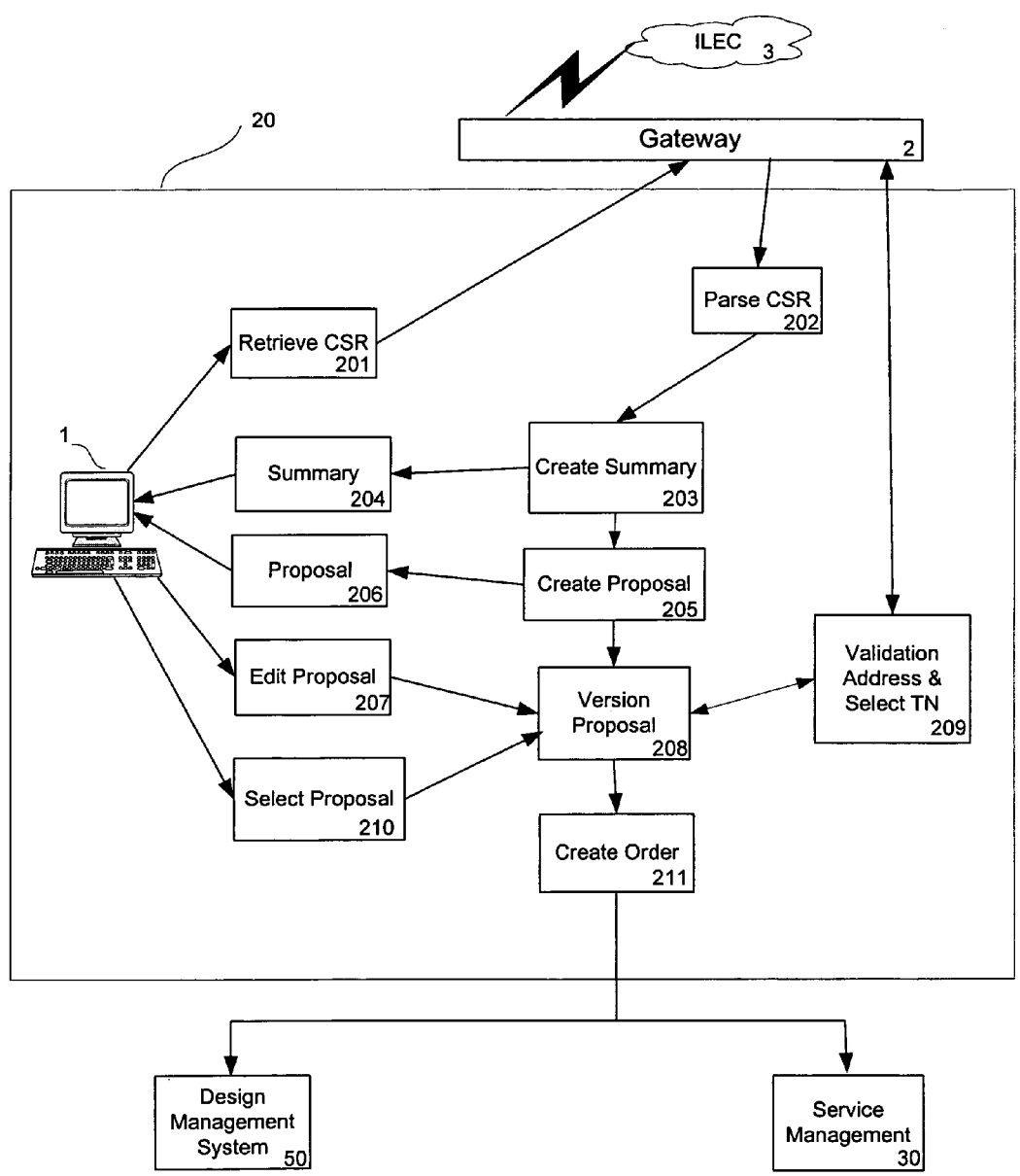
Figure 2 - Pre-Order Management System

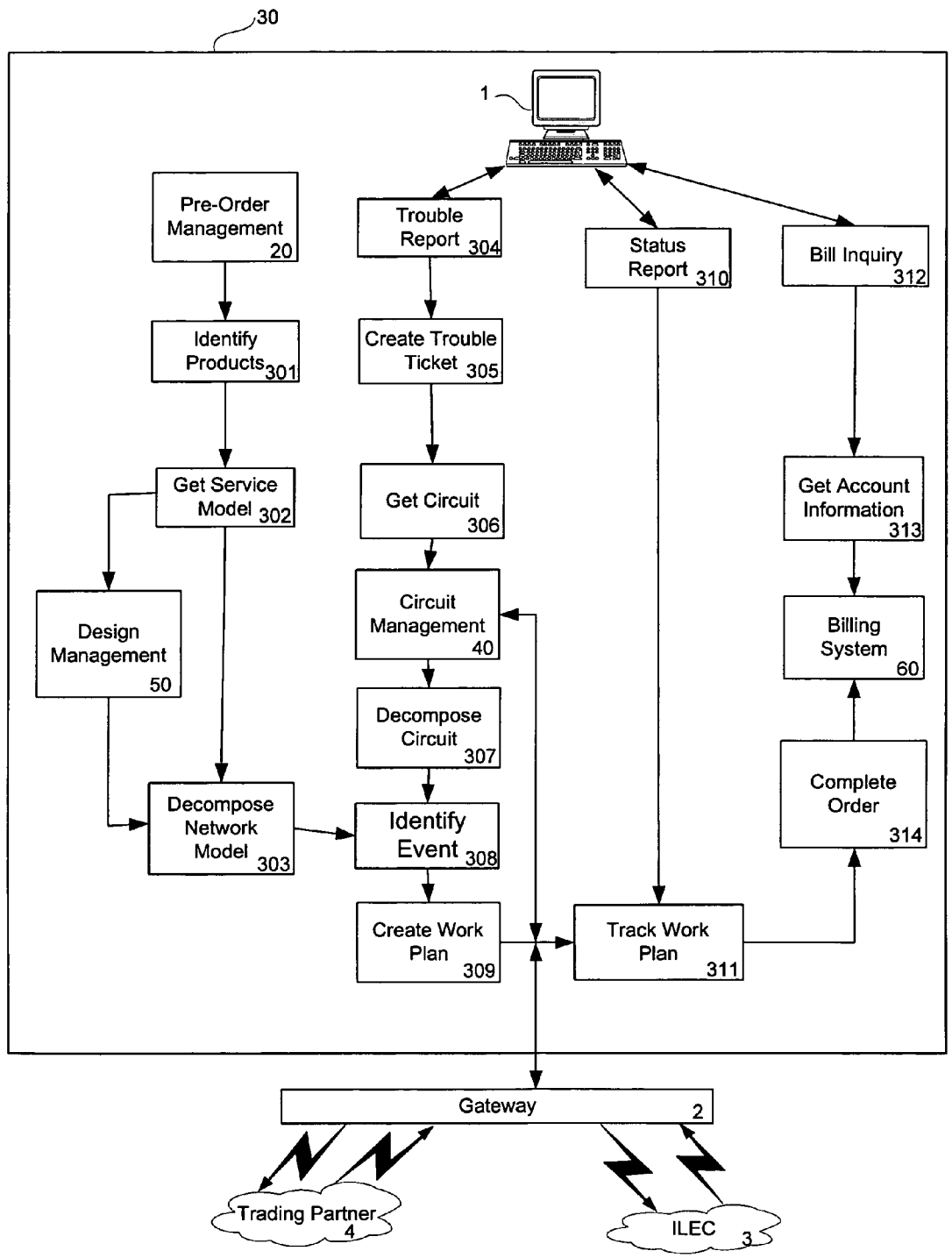
Figure 3 - Service Management System

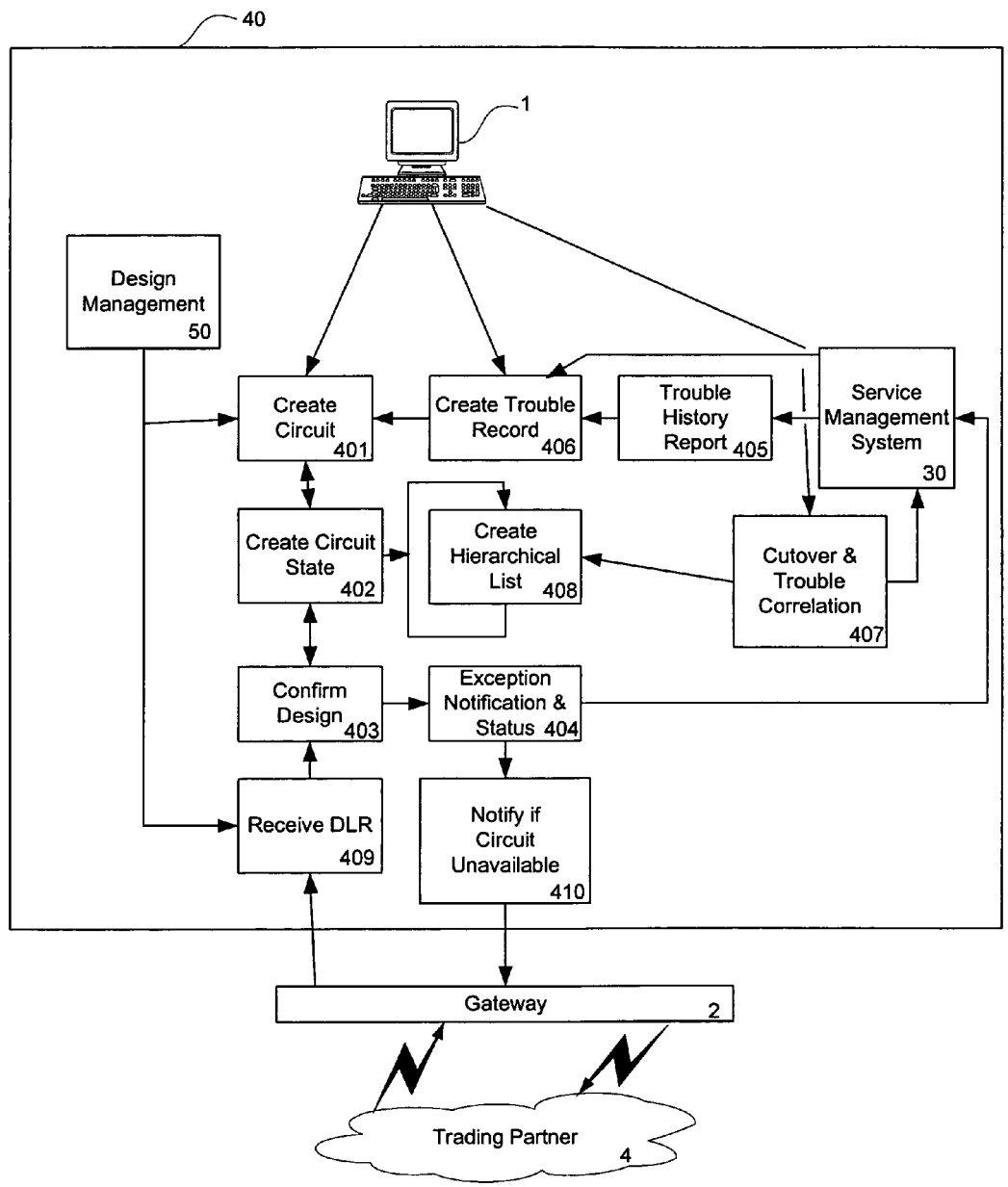
Figure 4 - Circuit Management System

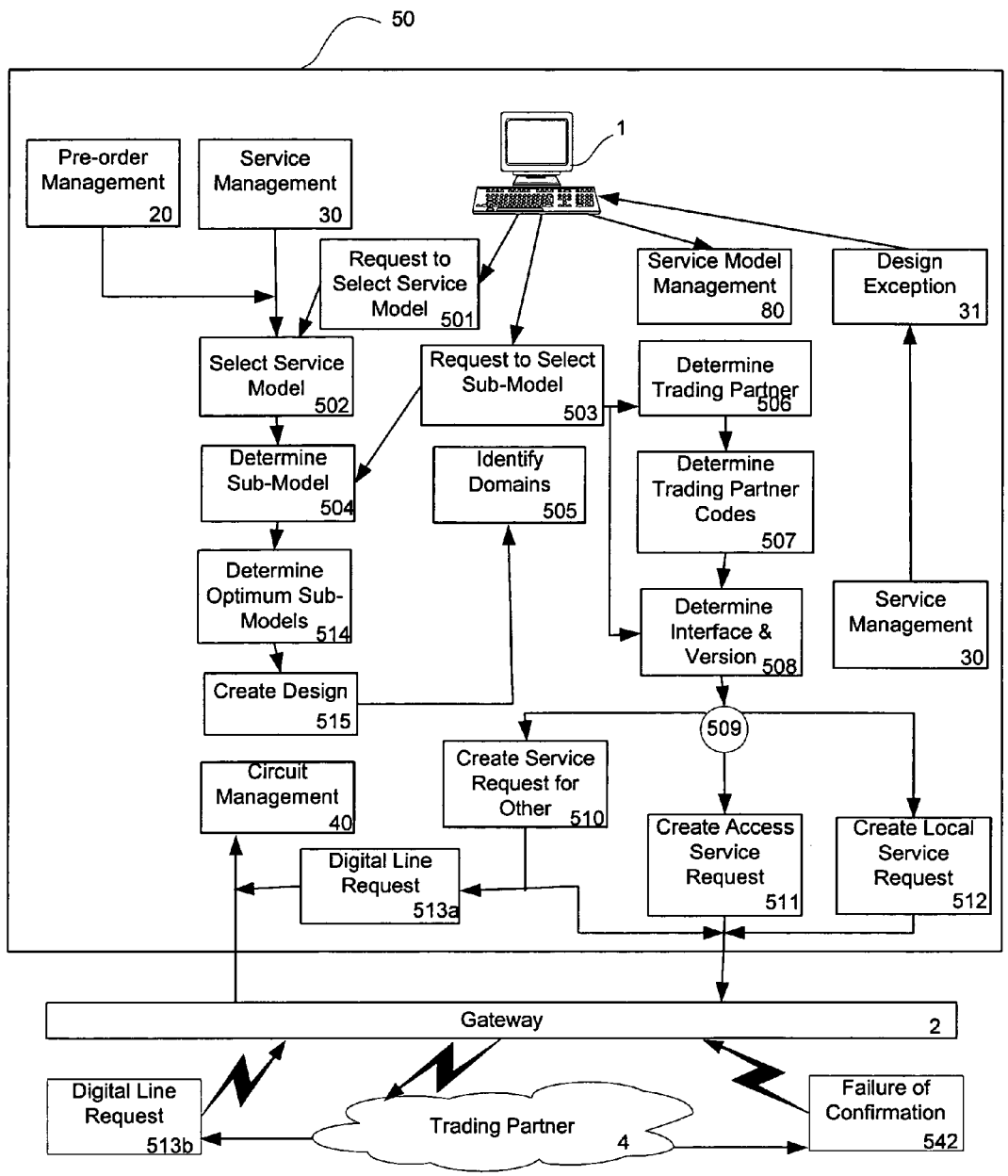
Figure 5 - Design Management System

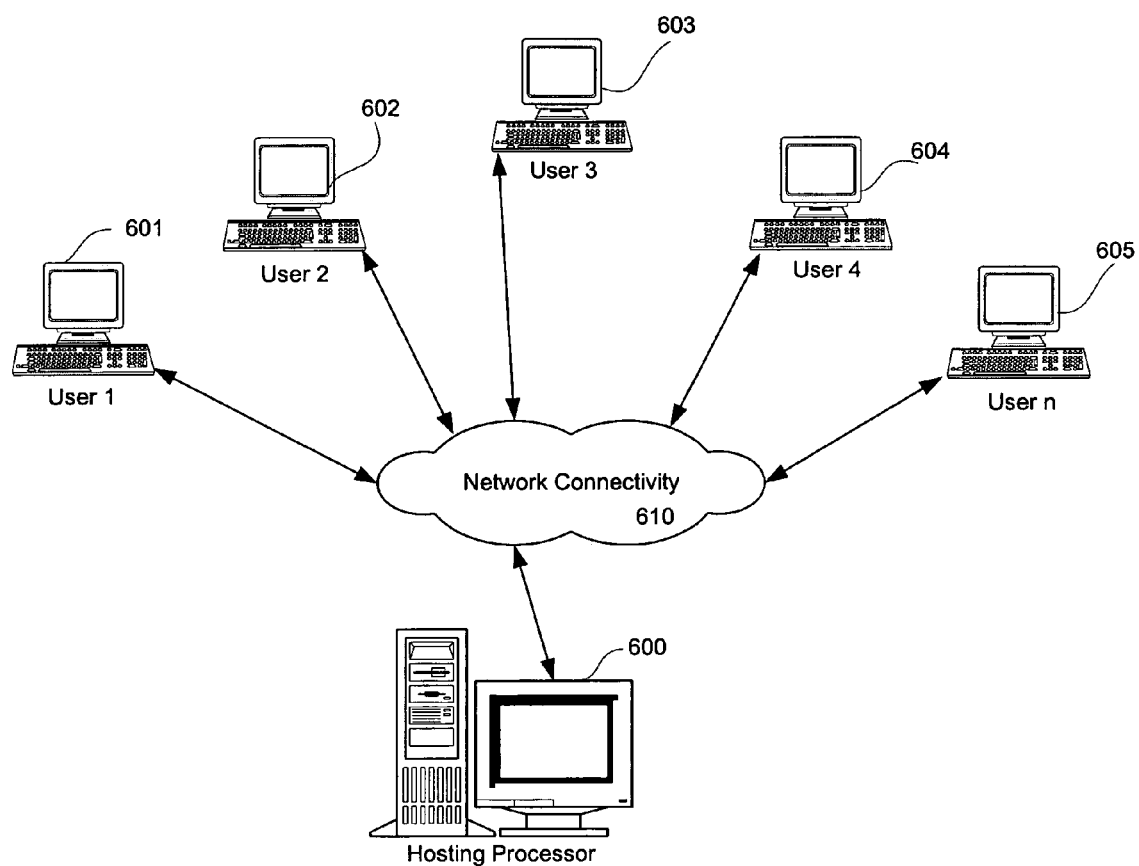
Figure 6 - Networked Service Manager

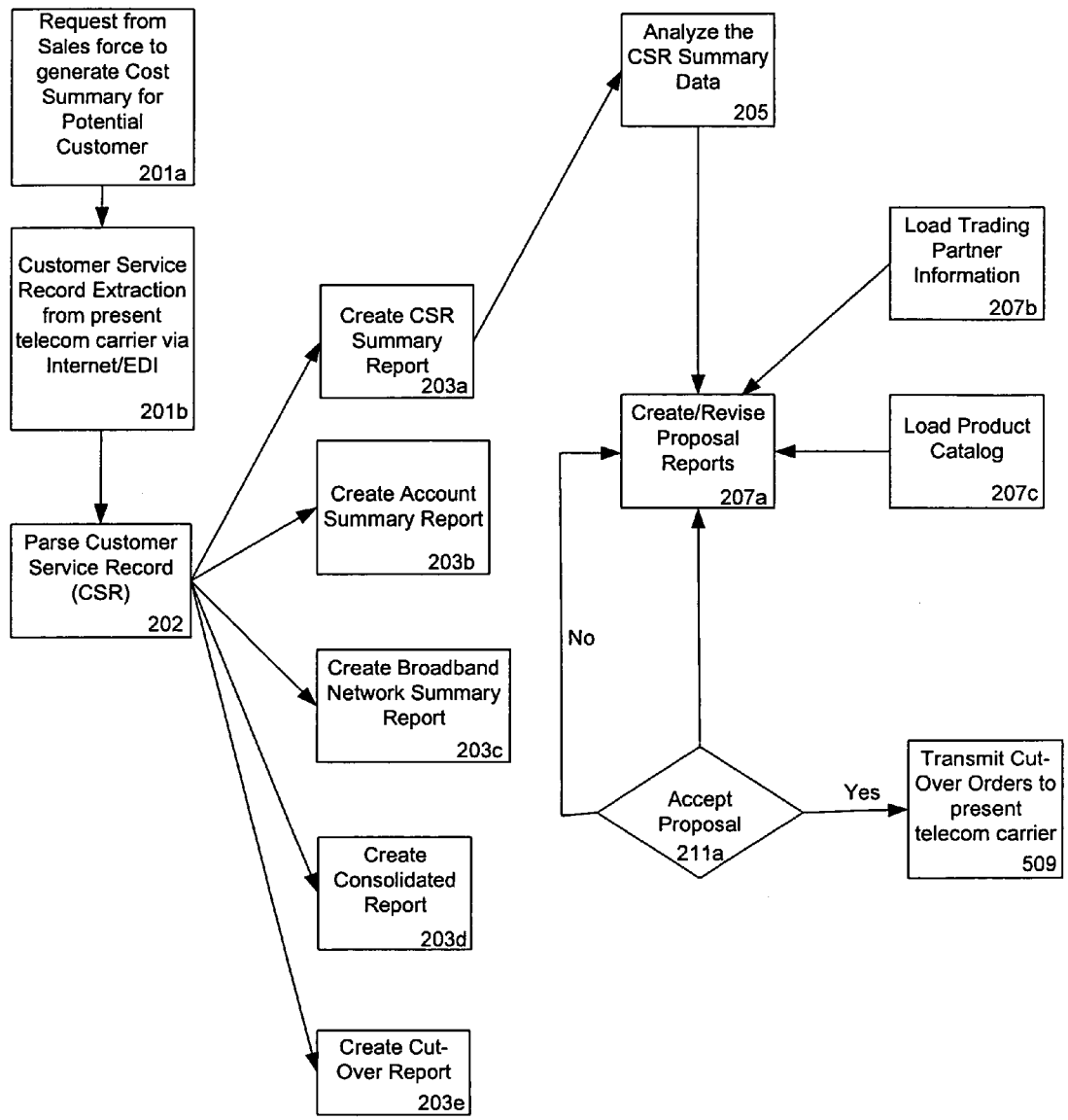
Figure 7 - Example Sales Proposal Cycle

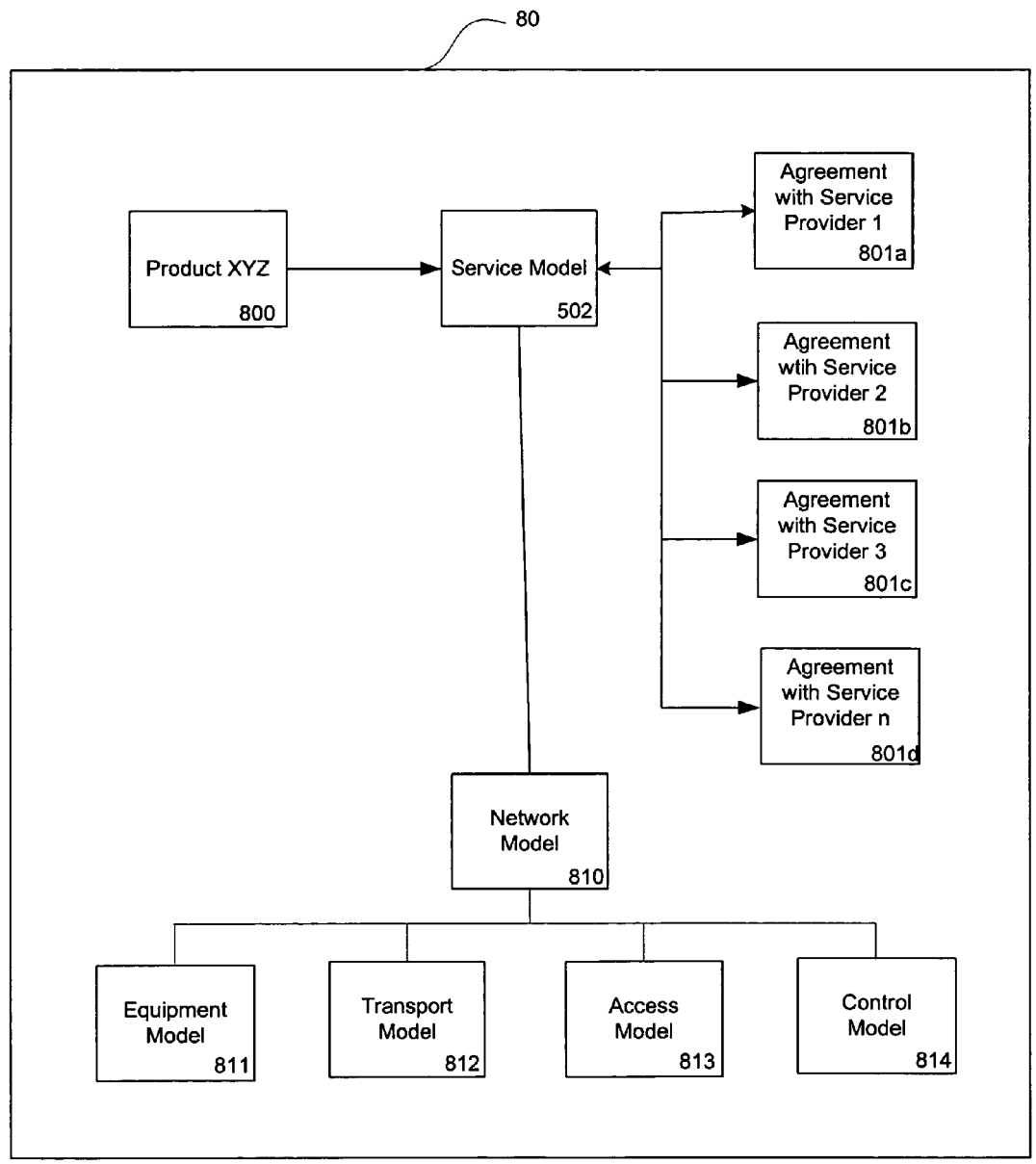
Figure 8 - Service Model Management System

FULLY INTEGRATED SERVICE MANAGER WITH AUTOMATIC FLOW-THROUGH INTERCONNECTION

RELATED APPLICATIONS

This application claims the benefit of U.S. Provisional Application No. 60/176,571, filed Jan. 18, 2000, entitled "Fully Integrated Service Manager With Automatic Flow-Through Interconnection " and naming David C. Curtis as inventor.

BACKGROUND OF THE INVENTION

Telecommunications service providers are entering the age wherein new service offerings and technological changes occur on a frequent basis. In order to maintain a competitive edge, providers need the ability to easily provide proposals that cover a customer's existing service for voice, data, video and Internet networks in terms of their own products. Presently the creation of such proposals is a semi-manual system that is costly and often inaccurate.

With the passage of the Telecommunications Act ("the Act") of 1996, the United States telecommunications industry is in a state of radical change. Among other things, the Act requires that Incumbent Local Exchange Carriers (ILEC), the regulated entity that owns and administers an existing access network, provide to any requesting telecommunications carrier (hereinafter referred to as "Competitive Local Exchange Carriers" (CLEC), Integrated Communications Provider (ICP), or Competitive Service Provider (CSP)) nondiscriminatory access to network elements on an unbundled basis and to allow CLECs, ISPs or CSPs to combine such network elements in order to provide telecommunications service. ILECs also have a duty to provide to CLECs interconnection with their network for the transmission and routing of telephone exchange service and exchange access. The interconnection contemplated by the Act provides nondiscriminatory access or interconnection to such services or information as are necessary to allow the requesting CLEC to implement local dialing parity, including nondiscriminatory access to telephone numbers, operator service, directory assistance, and directory listing, with no unreasonable dialing delays. The provisions of the Act have demonstrated a need for competing exchange carriers to be interconnected so that customers can seamlessly receive calls that originate on another carrier's network and place calls that terminate on another's carrier's network without performing additional activities, such as dialing extra digits, etc. A CLEC can offer multiple types of services, including basic POTS, IXC long distance carrier service, ISP Internet Service Provider, VPN (virtual private network), VoIP (voice over internet), VoDSL (voice over DSL access), video, etc. Many of the more advanced services require access to broadband services.

Recent adoption of Digital Subscriber Line (DSL) technology allows customer access to these broadband services over their existing copper wire connection to the ILEC. With DSL, subscribers only need to purchase (or lease) a comparatively inexpensive DSL modem and connect it to the existing copper wire connection. Other advances in broadband data services can be combined with DSL service to provide the subscriber with additional connectivity options. Virtual Private Networks (VPNs) are also seeing explosive growth, especially in the remote-office and tele-commuter environments. VPNs and DSL allow a subscriber to connect to a private corporate network over a public infrastructure securely, while maintaining high bit-rate transmissions. Subscribers are also beginning to test the waters with Voice Over DSL (VoDSL) deployments. This technology allows subscribers to run multiple phone and data connections over a single copper line, using just one customer premise xDSL modem.

The opportunities for CLECs, IXCs, and ISPs (collectively identified from this point on as Integrated Communications Providers or ICPs) offering these services are immense. Data transport demands have opened up a whole new set of revenue generating opportunities for ICPs. However, the growth rate and myriad of convergent offerings make it difficult for companies to establish themselves in any one market. To be successful, ICPs need to remain flexible, customer focused, and establish a continual set of value propositions and competitive advantages within the marketplace.

ILECs have developed different methods to allow ICPs to electronically place orders with the ILEC for wholesale products and services. For example, U.S. Pat. No. 6,104,999 to Gilles et al. and incorporated by reference herein, discloses that LECs use Internet browser forms, proprietary protocols and electronic data interchange (EDI).

In one embodiment, the Gilles patent discloses methods of using EDI for telecommunication provider retrieval of customer service records and electronic services ordering. An authorized ICP or reseller utilizes EDI to request from the ILEC the present services being provided to a particular customer. The ILEC uses EDI to transfer the customer service record to the ICP. In a separate embodiment, the ICP uses EDI to electronically order revisions or additions to service.

During electronic services ordering, a number of pre-ordering steps are required. For example, if a telephone number, Internet domain name or Internet Protocol (IP) address is available it is reserved as part of the pre-ordering function. In addition, due date of initiation of new service is transmitted and either confirmed or revised. Also, certain validation steps are required, including customer service address.

Various uses have been made of electronic access to customer service records (CSR). For example, U.S. Pat. No. 6,032,132 to Nelson discloses using the CSR to validate billing between an ICP and an ILEC. Similarly, U.S. Pat. No. 5,416,833 to Harper et al. and U.S. Pat. No. 5,920,846 to Storch et al. disclose an ILEC using the CSR to process changes to service provided by the ILEC and to respond to CLEC requested changes.

However, the customer service record (CSR) is also independently useful to ICPs. As the CSR often identifies both ILEC provided services as well as services of competing ICPs and resellers, it is convenient for ICPs and resellers to retrieve a customer service CSR in preparing a sales proposal. Following retrieval, the CSR is interpreted and ICP competing service offerings are identified. The sales proposal is based upon this analysis and a final proposal is presented to the customer. Up to now, the CSR has been printed then manually compared to an ICP's service offerings. This manual process is labor intensive and prone to errors. As a result, a method of automating the sales proposal function based on CSR is needed.

Once a customer accepts a sales proposal for ICP services, it must be provisioned and appropriate request for service orders issued to ILECs. Presently these requests are manually originated. By automating the activation and provisioning process, ICPs will be able to significantly reduce the overhead that is associated with manual provisioning processes. Additionally, the error rate associated with manual activation will be reduced significantly as well.

Of course, an ICP must be successful in obtaining customers and also capable of adequately servicing those customers at a competitive price. Historically, telecommunication service customers dealt with a single ILEC that was responsible for all aspects of the customers needs, including service interruptions. ICPs are in the difficult situation of dealing with customer demands for single point service contact while bundling services from multiple telecommunication providers. When a customer reports interruptions in service, an ICP must determine which service provider or providers are involved and "decompose" the trouble sources thereby identifying sub-components and their ownership. Next, the ICP must initiate trouble ticket controls, which refer trouble reports/work steps systems/organizations involved in testing and repair of the service impairment. The referrals then need to be monitored closely, through closeout of the impairment.

Once repaired, the ICP must ensure that any rebate or credit defined by contractual relationships is honored by the billing system when the report is closed. Finally, it is advantageous for the ICP to maintain a history of service failures in order to determine the areas in which it needs to improve, as well as how well and how quickly it responds to customer situations.

In order to stay competitive, ICPs typically use a hybrid network with the ICP providing only a portion of the network equipment. As a result, an ICP may have multiple trading partners that fulfill different components of their network offerings. The ICP may own some pieces required to service the customer, such as a local switch, while they may lease others, such as the local loop. Finally, they may need to resell certain parts of a convergent order, such as a cable or wireless portion, from wholesalers or other trading partners. Components owned by the ICP are termed "on-net", while leased components or resold services are termed "off-net."

Depending upon the technology available for a customer's location and the components available from the ICP, an optimal mix of on-net and off-net resources are selected. This selection process is key to an ICP's ability to offer competitively priced services. Manual selection of the optimal mix is expensive and prone to errors. As a result it is desirable that an ICP use an automatic means of selecting the optimal mix of components to fulfill a customer's service requirements.

SUMMARY OF THE INVENTION

The present invention is a system and method for retrieving customer service records and preparing sales proposals from these records. It is an object of the present invention to automate the sales proposal cycle for integrated communication providers (ICP).

It is a further object of the present invention to incorporate present customer service into sales proposals by parsing and interpreting customer service records (CSR) that are electronically retrieved from incumbent local exchange providers (ILEC) and communications trading partners.

It is a further object of the present invention to utilize an optimization algorithm to select preferred sub-model components for a given sales proposal.

It is yet another object of the present invention to provide an automated means to aid an ICP in providing single point-of-contact for its customers' service interruptions. Such aid decomposes a customer service into on-net and off-net components with appropriate contacts for receipt of trouble tickets.

One embodiment of the invention comprises a system for supporting the management of an ICP including a computer processor means for inputting and processing information necessary to the management of an ICP as well as hosting a gateway and graphical user interface. The gateway, comprises a means of transferring information to and receiving information from telecommunication service providers, preferably in an electronic format such as electronic data interchange (EDI), more preferably in conformance to order and billing forum (OBF) requirements, and further preferably provides validation checking of transmissions in conformance with local service ordering guidelines and access service ordering guidelines established by telecommunications providers.

The processing of information comprises software instructions grouped into a pre-order management component, a service management component, a design management component and a circuit management component.

The pre-order management component comprising an automatic means of retrieving customer service records from telecommunication service providers and parsing said customer service records into reports containing equivalent ICP services. The service management component comprises an automatic means of creating and tracking work plans that are comprised of a set of work activity events for performing installation or troubleshooting of each sub-model component of a telecommunications service provided by the ICP to a customer.

The circuit management component comprising a means of automatically creating a hierarchal list of ICP on-net circuit assignments and a means of automatically creating a cutover work plan for service provisioning and activation. The circuit management component further comprises an automatic means of receiving requests from trading partners of the ICP; such requests from trading partners are either rejected or inserted into said hierarchal list.

The design management component comprises a means for automatically selecting a communications service or network model, preferably using an optimizing algorithm; decomposing said service model into sub-model components and creating a communications design therefrom. It further comprises a means of automatically issuing service requests to ICP trading partners.

In a further embodiment of the invention, the computer processor is replaced with a hosting processor further comprising a processing means, hosting of a gateway, graphical user interface and network connectivity means such as a connectivity means to a local area network, Internet, intranet, wireless network, or wireless local loop network. Preferably the hosting processor utilizes hypertext markup language for its graphical user interface displays.

Another embodiment of the present invention provides a system for managing sales proposals of an ICP including a computer processor means for inputting and processing information necessary to the management of an ICP as well as hosting a gateway and graphical user interface. The gateway, comprises a means of transferring information to and receiving information from telecommunication service providers, preferably in an electronic format such as electronic data interchange (EDI), more preferably in conformance to order and billing forum (OBF) requirements, and further preferably provides validation checking of transmissions in conformance with local service ordering guidelines and access service ordering guidelines established by telecommunications providers.

The processing of information comprises software instructions grouped into a pre-order management component, a service management component, a design management component and a circuit management component.

In a further embodiment of the invention, the invention provides a system for managing sales proposals of an integrated communications provider, hereinafter an integrated communications provider is referred to as an ICP, said system for managing sales proposals of an ICP comprising:

a computer processor means for inputting and processing information necessary to the management of an ICP;

a gateway means of transferring information to and receiving information from telecommunication service providers;

a pre-order management component comprising an automatic means of retrieving customer service records via hypertext markup language (HTML), electronic data interchange (EDI) and common object request broker (CORBA) protocols, from telecommunication service providers and parsing said customer service records into reports containing equivalent ICP services;

a design management component comprising a means for automatically selecting a communications service model; decomposing said service model into sub-model components and creating a communication services sales proposal therefrom;

wherein subsequent versions of said sales proposal are automatically created subsequent to a request from a human operator for alternate communication service models.

BRIEF DESCRIPTION OF THE DRAWINGS

FIG. 1 schematically illustrates a process diagram of the system of the present invention;

FIG. 2 schematically illustrates the Pre-Order Management component of the present invention;

FIG. 3 schematically illustrates the Service Management component of the present invention;

FIG. 4 schematically illustrates the Circuit Management component of the present invention;

FIG. 5 schematically illustrates the Design Management component of the present invention;

FIG. 6 schematically illustrates an embodiment of the present invention adding the feature of network access.

FIG. 7 schematically illustrates an embodiment of a sales proposal cycle utilizing the present invention;

FIG. 8 schematically illustrates an embodiment of a Network Model Management System of the present invention.

DETAILED DESCRIPTION OF THE INVENTION

The present invention comprises a system useful to integrated communications providers (ICPs) and resellers of ICP services for providing sales proposals based upon customer service records. As used in this description, the following definitions apply:

ANSI—American National Standards Institute—United States-based organization that develops standards and defines interfaces for telecommunications.

ASR—Access Service Request—A request for service covered under the FCC's access tariffs as described by Order and Billing Forum.

ATM—Asynchronous Transfer Mode—An international ISDN high-speed, high-volume, packet switching transmission protocol standard. ATM uses short, uniform, 53-byte cells to divide data into efficient, manageable packets for ultra-fast switching through a high-performance communications network.

CLEC—Competitive Local Exchange Carrier

CORBA—Common Object Request Broker Architecture—an architecture neutral, object oriented client-server solution. With CORBA you can abstract an object by its services and publish these using the IDL (Interface Definition Language). A client can then connect to and use these services.

CMIS/CMIP—Common Management Information Services and Protocol—international standard for network management protocol.

CSR—Customer service record

DSL—Digital subscriber line—allows broadband communication services over copper telephone lines DD—Due Date—The date in which a communication service request is scheduled to be completed.

DLR—Digital Line Request—Request for digital communication services.

EDI—Electronic data interchange—An industry standard (ANSI X12, X.400) for direct computer-to-computer information exchange.

FID—Field IDentifier—Used on service orders that indicates more data will follow. A label on a service order that prefaces service order information. FIDs are alpha or alphanumeric codes that identify retained information on an account, indicate physical or record activity, generate or negate non-recurring charges, specify recurring charges, document work done by various departments and identify facilities used to provide service.

FOC—Failure of Confirmation—A form of error message created when a request for communication services is either not received by or accepted by the services provider.

Frame Relay—Industry-standard, switched data link layer protocol that handles multiple virtual circuits using HDLC encapsulation between connected devices.

ICP—Integrated communications provider

ILEC—Incumbent local exchange carrier

ISDN—Integrated Services Digital Network. Communication protocol, offered by telephone companies, that permits telephone networks to carry data, voice, and other source traffic.

ISP—Internet Service Provider—a company that provides individuals and other companies access to the Internet and other related services.

IXC—Inter-exchange Carrier—A carrier authorized by the Federal Communications Commission (FCC) to provide interLATA, interstate and/or international long distance communications services; a carrier authorized by a state Public Utility Commission (PUC) to provide long distance communications service but not local exchange service within state boundaries. Also referred to as "IC", "IEC", or "IXC".

LATA—Local Access and Transport Area.

LCC—Line Class Code—Identifies to the switch a particular class of service. It can be identified by a USOC, FID, or some combination of the two. The FID would modify the USOC by qualifying the class of service with specific attributes such as 700/900 blocking.

LEC—Local exchange carrier

LSR—Local Service Request—A request for service covered under the Local utility commission's tariffs, as described by Order and Billing Forum.

LST—Line and Station Transfer—Rearrangement of outside network facilities to support service activation.

NAAR—Network Address Assignment Request—Request for a network address assignment such as phone number or Internet protocol addresses (IP address).

OBF—Order and Billing Forum

POTS—Plain Old Telephone Service—Basic telephone service for the transmission of human speech.

SONET—Synchronous Optical Network—1984 ANSI standard for optical fiber transmission on the public network. 52 Mbps to 13.22 Gbps. standard for communications over a fiber optic network.

TN—Telephone Number—A ten digit number comprised of an area code (NPA), an exchange (NXX), and an extension.

USOC—Universal Service Order Code—An alphanumeric coding scheme that identifies products and services that have been ordered by a customer.

VOD—Video On Demand.

VoDSL—Voice over DSL. The ability to carry normal telephone-style voice over a digital subscriber line (DSL) with POTS-like functionality, reliability, and voice quality.

VoIP—Voice over IP. The ability to carry normal telephone-style voice over an IP-based Internet with POTS-like functionality, reliability, and voice quality.

VPN—Virtual Private Network—Switched network with special services like abbreviated dialing. A customer can call between offices in different area codes without having to dial all eleven digits.

As shown in FIG. 1, the invention comprises four major components designed to automate manual and semi-manual tasks that are performed by ICPs in pursuit of and providing support and service order management for customers. The Pre-order management component 20 is used to access a customer service record, develop summary of services and create sales proposals. The service management component 30 provides an integrated approach to order and trouble tickets wherein a consistent user interface is provided for both on-net and off-net communication services. The circuit management component 40 maintains an inventory of ICP owned circuits (on-net asset), their related equipment and the customer to which any circuit is assigned. The design management system 50 is used to design new services for customers and issue electronic requests for services to trading partners. Although depicted separately, all components are seamlessly integrated to perform as an integrated ICP operations support system (OSS).

FIG. 2 illustrates the Pre-order Management component 20 that supports pre-order functions such as sales proposal generation, customer service record (CSR) retrieval and analysis. Communication to the incumbent local exchange carrier 3 (ILEC) is established in a gateway sub-component 2. This gateway is available directly to all components of the invention and is depicted on FIGS. 2, 3, 4 and 5.

The gateway is preferably an OBF and EDI standards compliant interconnection gateway providing automated electronic access to ILEC and ICP trading partner order systems. User-definable configuration files are used to compensate for individual ILEC or trading partner variations to these standards. The gateway allows an ICPs internal order management system to transfer and share relevant information including customer service record (CSR) retrieval, order fulfillment requests, and order status updates with ILEC or ICP trading partner systems. In addition, the gateway preferably handles data translations for EDI, CORBA, CMIP/CMIS, as well as translating coded information from foreign systems (including proprietary protocols). More preferably, the gateway provides a validation check to ensure compliance with basic usage rules contained in Local Service Ordering (LSOG) and Access Service Ordering (ASOG) guidelines set forth by ILECs.

Referring to FIG. 2, Pre-Order component 20 comprises sub-process 201 that allows an ICP sales representative to initiate CSR retrieval from an ILEC or ICP trading partners. Once retrieved, the CSR is then "parsed" at sub-process 202, wherein certain information contained in product and service codes (universal service ordering codes (USOC)/feature identifier codes (FID) codes) is summarized and a report of present customer service is generated at sub-process 203 and displayed to the user at 204. Similarly, sales proposals are automatically generated at 205 and displayed to the user at 206. Sales proposals are generated by selecting from a database of ICP services comparable to CSR reported services. The generated sales proposals preferably compare features and costs of ICP provided services in comparison to existing customer received services. The initial sales proposal is designated version 1.

ICP sales representatives are able to revise the sales proposal by issuing instructions at 207 to add or delete available services. In a preferred embodiment, the various revisions of the sales proposals are saved electronically as separate versions. This allows comparison between proposal versions during sales discussions with the customer. The ICP sales representative selects which proposal to print for presentation to the potential customer at 210.

Another feature of the pre-order component is the ability to validate requested services against availability of those services as well as reserving telephone numbers and IP addresses at sub-process 209. Validation also occurs during CSR retrieval and parsing, when the codes received from the ILEC are validated against validation tables (for example, USOC, switch, equipment, LATA information etc).

Additionally, the pre-order component automatically creates service orders at 211 from accepted sales proposals. The service orders are then routed to the service management component 30 and design management components 50.

FIG. 3 illustrates the Service Management 30 component of the invention. In general, the Service management component is useful in managing the implementation of new service to customers, revisions to customer services and resolving service interruptions. The successful ICP is often required to provide single point of contact to the customer. A customer may inquire as to service interruption 304, status report 310, or recent bill 312.

In the event of service interruption, a trouble report is issued at 304 that creates a trouble ticket 305. The service management component accesses an internally stored customer file to identify which assigned communication circuit or circuits are suspect at sub-process 306. The service management component accesses the circuit management component 40 that decomposes the suspect circuit at 307 into its on-net and off-net assets and identifies the responsibilities for repair of each asset at 308, termed work events. The service trouble ticket is then converted into a service work plan 309 which requests repair services from the appropriate service group of the ICP via the circuit management component 40 or via the gateway 2 to for example an ICP trading partner 4 or ILEC 3.

All service work plans comprise a status field or fields. These fields are updated as identified events on the plan are completed. For example, a work plan may include service personnel from the ILEC traveling to the customer premises to inspect suspect interface gear or broken wiring as well as ICP performing network transmission tests. The work plan would then contain two identified events, each of which has a status field that is updated as the work is performed.

For new ICP customers, the service work plans are created from the accepted customer sales proposal created by the pre-order management component 20. The sales proposal identifies the quantity and location of different communication products 301 the customer has ordered from the ICP and requests appropriate service models 302. The service management component retrieves a service model for each communication product, based in part, upon the location and ILEC or ICP trading partner involved. The design management component 50 is automatically accessed to decompose the service model into individual work events at 303. Service work events are identified 308 and a service work plan is then created and comprises the sum of all of the work events 309.

The service management component treats service work plans created from a trouble ticket or an accepted sales proposal in the same manner. As a result, the status of new customer services is tracked and can be retrieved at any time. When a new service is functioning properly, a "complete order" notification 314 is automatically transmitted to the ICP's billing system 60 and charges for the service to the customer is initiated.

Customers often inquire as to interpretation of bills they receive from the ICP. The service management component allows ICP personnel to make a bill inquiry 312 to access customer information and recent customer billing at 313. Such bills are stored by customer account number for rapid retrieval.

FIG. 4 illustrates the Circuit Management component 40 of the invention. This component maintains an inventory of ICP owned circuits (on-net asset) and the customer to which any circuit is assigned. A data line request (DLR) 409 is received either from a trading partner 4 or from the design management component 50. For example, during creation of a sales proposal, the design management component may request a particular on-net circuit. This request is relayed to the circuit management component for processing.

The DLR is processed by determining if the request conforms to ICP product offerings at 403. It is then reviewed to determine if an on-net asset is available to satisfy the request by creating the required circuit state at 402. If the on-net circuit is available, it is placed on reserve in a hierarchal list 408. The purpose of the list is to reserve circuits based upon criteria such as quality of service requested, availability of alternates, and source of the request. When two or more individual circuits are to be combined the design of the combined circuit is confirmed for compatibility. When a requested circuit or circuit design cannot be satisfied, an error notification 404 is generated and transmitted to the service management component 30 or to the trading partner 4 via the gateway 2, when the trading partner originated the DLR. A separately generated notification message 410 is used for matching trading partner formats.

The circuit management component also comprises a circuit testing means. This testing means can place any selected circuit into a desired state at 402 and the resultant data flow through the circuit tested. Testing can be done on an automatic basis with results reported as a trouble record 407 and transmitted to the service management component 30.

For new or revised customer services, a cutover request is generated at 407 and placed into the circuit hierarchal list 408. This cutover request manages both additions and deletions to circuit assignments.

An alternate source of cutover request can occur subsequent to service interruption or trouble ticket creation 406 by the service management component 30. In one embodiment of the present invention, the circuit management component may place physical groupings of circuits into a "suspect" status when more than 1% error rate from a member circuit is reported at 406. This may be initiated from the user directly, or automatically from trouble history reports 405. The threshold error rate may be set higher or lower depending upon the quality of service associated with that circuit. For example, voice feature lines are able to accept a higher error rate as compared to data transmittal features. Such errors can also be set to initiate the search for alternate communication circuits via the link to the circuit creation sub-process 401.

FIG. 5 illustrates the Design Management component 50 of the invention. Design Management is used to design the optimum mix of on-net and off-net components to satisfy a customer service requirement. Based upon criteria established by the ICP, a design proposal is automatically formulated.

A request for a circuit design is originated from the service management component 30, the pre-order component 20 or by an ICP employee's request 501 via the processor 1. The request selects a model for the type of communications service requested at 502. An ICP may offer a large number of services. Each of the service offerings is described in a service model that identifies in sub-model fashion 504, the type of service, the interconnections required, distance charges, interface equipment and software. The ICP employee is allowed to enter a request for a particular service model 502 at 501 or a particular service sub-model 504 at 503. The sub-models are compiled into the complete design at 515.

In order to create and maintain service model, the ICP employee can access a service model management component 80. FIG. 8 illustrates one embodiment of a service model for an example product XYX at 800. The service model contains agreements from service providers 801a through 801d associated with that product. The product is further associated with a network model 810 comprising an equipment model 811, a transport model 812, an access model 813 and a control model 814.

Based upon the service model 502 and sub-models 504 selected, the design management system 50 preferably applies an optimizing algorithm 514, shown in FIG. 5 that determines the origin of supply of the various sub-model components. Optimizing criteria include cost factors, availability, quality of service requested, on-net vs. off-net services, recurring vs. non-recurring services and trading partner preferences. For example, one network may be optimized for quality of service, another network optimized for lowest cost to the ICP and another network optimized to meet trading partner sales quotas. As a result, the optimizing algorithm provides the important link between ICP management objectives and resulting network design.

From the completed design at 515, the design management sub-component automatically decomposes the sub-model components and identifies domains for off-net components and on-net components at 505. For off-net components the trading partner is determined at 506 and appropriate trading partner codes are determined at 507. On-net component requests do not require these two intermediate steps. Next the interface and version are determined at 508 and service request orders are generated at 509. In general service request orders include Access Service Request 511, Local Service Request 512 and other service requests 510. Service requests for on-net components are transferred to the circuit management component 40 for processing. Off-net component requests are then forwarded to the trading partner 4 for confirmation or reservation.

One type of service request 509 is the Network Address Assignment Request (NAAR). A NAAR may require going out to an ILEC or trading partner to reserve and port a particular phone number or Internet protocol addresses (IP address). The system will create an OBF standard (ASR/LSR) request to be sent to the trading partner to acquire the address. The trading partner will either accept the request or issue a failure of confirmation (FOC) notification 542. Any FOCs received, are transferred to the service management component 30 for resolution.

For clarity, FIGS. 2, 3, 4 and 5 depict a single processor 1. However, a typical ICP has numerous employees, each of which may require simultaneous use of the invention. As a result, the invention is preferably used in a client-server arrangement as illustrated in FIG. 6. A hosting processor 600 operates the management components and attaches to a system 610 that provides for network connectivity between users 601 through 604 and the hosting processor. Various forms of network connectivity are possible including Internet, intranet (including local area network), wireless, and wireless local loop.

When the hosting processor is used in an environment providing intranet or Internet connectivity it is preferable that compatibility with common web-browsers be incorporated. For example, if hypertext markup language (HTML) is used, the hosting processor can be compatible with Microsoft Internet Explorer as well as Netscape.

EXAMPLE

An example of using the invention during a sales proposal by an ICP is illustrated in FIG. 7 and comprises the following:

1. A request from a sales representative or trading partner of the ICP is received.
2. Using the Pre-order management component 20, a request 201*a* for the potential customer's CSR is entered. The Pre-order management component sends a request through the gateway to the incumbent local exchange carrier (ILEC) for the CSR.
3. The Pre-order management component, receives the CSR then parses it at 202 into recognizable codes and prepares as summary reports: CSR summary 203*a*, Account summary 203*b*, Broadband network summary 203*c*, consolidated reports 203*d* and cut-over report 203*e*. The consolidated reports feature combines the summaries from multiple customer locations.
4. The Design management component 50 is then used to analyze further the CSR summary and select communication service models that satisfy present customer communication services. The optimizing algorithm 514 available in the design management selects the preferred sub-model components from the ICP's on-net product catalog 207*c* and off-net trading partner product catalogs 207*b*. The resultant network design and prices are combined into an initial proposal at 207*a*. When multiple customer sites are involved, the invention preferably creates a consolidated summary of the individual proposals.
5. The sales representative then reviews the initial proposal and enters revisions or creates separate versions for comparison 207*a*. For example, alternate versions may be created using different technology choices such as frame relay or DSL.
6. The resultant versions of the sales proposal are then presented to the potential customer for acceptance 211*a*. If the proposal is not accepted, the sales representative can create additional versions of the proposal to present later.
7. Once the customer has accepted a sales proposal, the design management component prepares a cut-over report, confirms availability of sub-model components, issues appropriate orders for customer communication services and creates a workplan in the service management component 509.
8. The service management component 30 is utilized by the sales representative to track implementation progress and respond to failure of confirmations (FOC) from ICP trading partners. Alarms are preferably programmed to notify the sales representative when target completion dates are in jeopardy of being missed.

While the present invention has been described in the context of the preferred embodiment thereof, it will be readily apparent to those skilled in the art that other modifications and variations can be made therein without departing from the spirit or scope of the present invention. For example, a system limited to the modules and functions identified in FIG. 7 is claimed as part of the invention. Accordingly, it is not intended that the present invention be limited to the specifics of the foregoing description of the preferred embodiment, but rather as being limited only by the scope of the invention as defined in the claims appended hereto.

What we claim is:

1. A system for supporting the management of an integrated communications provider (ICP), said system comprising:

a computer processor means for inputting and processing information necessary to the management of an ICP;

wherein the computer processor further comprises a graphical user interface for displaying information or data entry prompting requests to a human operator;

a pre-order management component comprising instructions for retrieving customer service records from telecommunication service providers and parsing said customer service records into reports containing equivalent ICP services;

a gateway for transferring information to and receiving information from telecommunication service providers;

a service management component comprising instructions for creating and tracking work plans;

wherein said work plans comprise a work activity event for performing installation or troubleshooting of each sub-model component of a telecommunications service provided by the ICP to a customer;

a circuit management component comprising instructions for creating a hierarchal list comprising ICP on-net circuit assignments and off-net circuit assignments;

wherein said circuit management component further comprises instructions for creating a cutover work plan;

wherein said circuit management component further comprises an automatic means of receiving requests from trading partners of the ICP;

wherein said requests from trading partners are either rejected or inserted into said hierarchal list;

a design management component comprising instructions for automatically selecting a communications service model; decomposing said service model into sub-model components and creating a communications design therefrom and;

wherein said design management component further comprises instructions for automatically issuing service requests to ICP trading partners and an optimizing algorithm, said optimizing algorithm determining an origin of supply of the sub-model components.

2. The system of claim 1 wherein the customer service records are retrieved using electronic data exchange with said telecommunication service providers.

3. The system of claim 1 wherein the gateway conforms to order and billing forum requirements for electronic data exchange.

4. The system of claim 1 wherein the gateway comprises instructions for validation checking of transmissions in conformance with local service ordering guidelines and access service ordering guidelines established by telecommunication service providers.

5. The system of claim 1 wherein the processor comprises a hosting processor means and a network connectivity means, said network connectivity means further comprising connectivity to a network selected from the group of networks including a local area network, the Internet, an intranet, a wireless network, a wireless local loop network, or a network comprised of combinations of local area networks, the Internet, intranets, wireless networks, and wireless local loop networks.

6. The system of claim 5 wherein the graphical user interface is displayed using hypertext markup language.

7. A system for managing sales proposals of an integrated communications provider (ICP), said system comprising:
    a computer processor means for inputting and processing information necessary to the management of an ICP;
    a gateway for transferring information to and receiving information from telecommunication service providers;
    a pre-order management component comprising instructions for retrieving customer service records from telecommunication service providers and parsing said customer service records into reports containing equivalent ICP services;
    a design management component comprising instructions for selecting a communications service model; decomposing said service model into sub-model components and creating a communication services sales proposal therefrom;
    wherein subsequent versions of said sales proposal are automatically created subsequent to a request from a human operator for alternate communication service models;
    wherein said design management component further comprises instructions for automatically issuing service requests to ICP trading partners;
    wherein such requests to ICP trading partners comprise requests for local service requests, assignment of telephone number request, assignment of Internet protocol address, and requests for data broadband services;

wherein said design management component further comprises instructions for creating cutover reports subsequent to acceptance of a sales proposal by a customer;

a service management component comprising instructions for creating and tracking work plans and an optimizing algorithm, said optimizing algorithm determining an origin of supply of the sub-model components;

wherein said work plans comprise a work activity event for performing installation or troubleshooting of each sub-model component of a telecommunications service provided by the ICP to a customer and;

a circuit management component comprising instructions for creating a hierarchal list of ICP on-net and off-net circuit assignments.

8. The system of claim 7 wherein the customer service records are retrieved using electronic data exchange with said telecommunication service providers.

9. The system of claim 7 wherein the gateway conforms to order and billing forum requirements for electronic data exchange.

10. The system of claim 7 wherein the gateway comprises instructions for validation checking of transmissions in conformance with local service ordering guidelines and access service ordering guidelines established by telecommunication service providers.

11. The system of claim 7 wherein the processor comprises a hosting processor means and a network connectivity means, said network connectivity means further comprising connectivity to a network selected from the group of networks including a local area network, the Internet, an intranet, a wireless network, a wireless local loop network, or a network comprised of combinations of local area networks, the Internet, intranets, wireless networks, and wireless local loop networks.

12. The system of claim 11 wherein the graphical user interface is displayed using hypertext markup language.

13. A system for managing sales proposals of an integrated communications provider (ICP), comprising:
    a computer processor means for inputting and processing information necessary to the management of an ICP;
    a gateway for transferring information to and receiving information from telecommunication service providers;
    a pre-order management component comprising instructions for retrieving customer service records from telecommunication service providers and parsing said customer service records into reports containing equivalent ICP services;
    a design management component comprising instructions for selecting a communications service model; decomposing said service model into sub-model components and creating a communication services sales proposal therefrom, and further comprising an optimizing algorithm, said optimizing algorithm determining an origin of supply of the sub-model components;
    wherein subsequent versions of said sales proposal are automatically created subsequent to a request from a human operator for alternate communication service models.

14. The system of claim 13 wherein the design management component further comprises instructions for compiling reports from multiple customer locations into a single consolidated report.

15. The system of claim 13 wherein the created sales proposals comprise a comparison between existing communication services and ICP provided services.

16. The system of claim 13 wherein the customer service records are retrieved using electronic data exchange with said telecommunication service providers.

17. The system of claim 13 wherein the gateway conforms to order and billing forum requirements for electronic data exchange.

18. The system of claim 13 wherein the gateway comprises instructions for validation checking of transmissions in conformance with local service ordering guidelines and access service ordering guidelines established by telecommunication service providers.

19. The system of claim 13 wherein the processor comprises a hosting processor means and a network connectivity means, said network connectivity means further comprising connectivity to a network selected from the group of networks including a local area network, the Internet, an intranet, a wireless network, a wireless local loop network, or a network comprised of combinations of local area networks, the Internet, intranets, wireless networks, and wireless local loop networks.

20. The system of claim 19 wherein the graphical user interface is displayed using hypertext markup language.

* * * * *